(12) United States Patent  
Tsai et al.

(10) Patent No.: US 11,907,462 B1
(45) Date of Patent: Feb. 20, 2024

(54) SCREEN MAPPING AND SPATIAL ARRANGEMENT SYSTEM

(71) Applicant: Toshiba Global Commerce Solutions, Inc., Durham, NC (US)

(72) Inventors: Wen Fu Tsai, New Taipei (TW); Hawaii Xuan, Taipei (TW); Yi Hsin Huang, Taipei (TW); Ying Chi Chou, Chiayi (TW)

(73) Assignee: Toshiba Global Commerce Solutions, Inc., Durham, NC (US)

( * ) Notice: Subject to any disclaimer, the term of this patent is extended or adjusted under 35 U.S.C. 154(b) by 0 days.

(21) Appl. No.: 18/108,149

(22) Filed: Feb. 10, 2023

(51) Int. Cl.
*G06F 3/041* (2006.01)
*G06F 3/044* (2006.01)
*G06F 3/04886* (2022.01)

(52) U.S. Cl.
CPC ........ *G06F 3/04142* (2019.05); *G06F 3/0446* (2019.05); *G06F 3/04886* (2013.01)

(58) Field of Classification Search
CPC ....... G06F 3/1446; G06F 3/044–04886; G06F 3/1423; G06F 3/14; G06F 3/04142; G06F 3/0446; G09F 9/3026; G09G 2300/026; G09G 2356/00; G09G 2300/02; G09G 2360/04; G09G 2360/06; G09G 2300/023; G09G 2360/00
See application file for complete search history.

(56) References Cited

U.S. PATENT DOCUMENTS

| 6,570,546 | B1* | 5/2003 | Welker | G06F 3/1446 345/11 |
| 9,134,950 | B2 | 9/2015 | Choi | |
| 9,354,840 | B2 | 5/2016 | Seo | |
| 9,911,176 | B2 | 3/2018 | Griffin | |
| 10,318,129 | B2 | 6/2019 | Inagaki | |
| 2010/0144283 | A1* | 6/2010 | Curcio | H04W 4/02 455/66.1 |
| 2012/0050135 | A1* | 3/2012 | Glen | G06F 3/1446 345/1.1 |
| 2015/0279037 | A1 | 10/2015 | Griffin | |
| 2016/0004351 | A1* | 1/2016 | Kimura | G06F 3/044 345/174 |

* cited by examiner

*Primary Examiner* — Temesghen Ghebretinsae
*Assistant Examiner* — Ivelisse Martinez Quiles
(74) *Attorney, Agent, or Firm* — Kaufman & Canoles, P.C.

(57) ABSTRACT

Systems and methods of automatic screen mapping are presented. In one exemplary embodiment, a method is performed by a controller device that is coupled to at least one of a set of display devices that are spatially arranged so that each display device is positioned adjacent to at least one other display device and wherein each display device includes a screen structure having a set of presence sensitive sensors. Each display device is operable, for each presence sensitive sensor of the corresponding screen structure, to detect a presence signal and to radiate a presence signal. The method includes receiving an indication that a second display device of the set of display devices has detected a presence signal radiated from a presence sensitive sensor of a first display device of the set of display devices so as to determine a spatial arrangement of the first and second display devices.

16 Claims, 10 Drawing Sheets

SCREEN MAPPING AND SPATIAL ARRANGEMENT SYSTEM

BACKGROUND

The use of multiple smaller display devices collectively arranged and operated to represent a much larger display device is a cost-effective alternative to the costs of manufacturing and installing an equivalently larger display device. In practice, a single image can be segmented into sub-images with each sub-image being displayed on the corresponding smaller display device so that the image is displayed on the represented larger display device. Further, the represented larger display device has a pixel resolution of the smaller display devices, which is likely much greater than the manufactured equivalent of the represented larger display device. Because each smaller display device is operated to display the corresponding portion of an image or video, the installation and configuration of the smaller displays to form the represented larger display device is complex and laborious.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

DETAILED DESCRIPTION

Figure 1A:
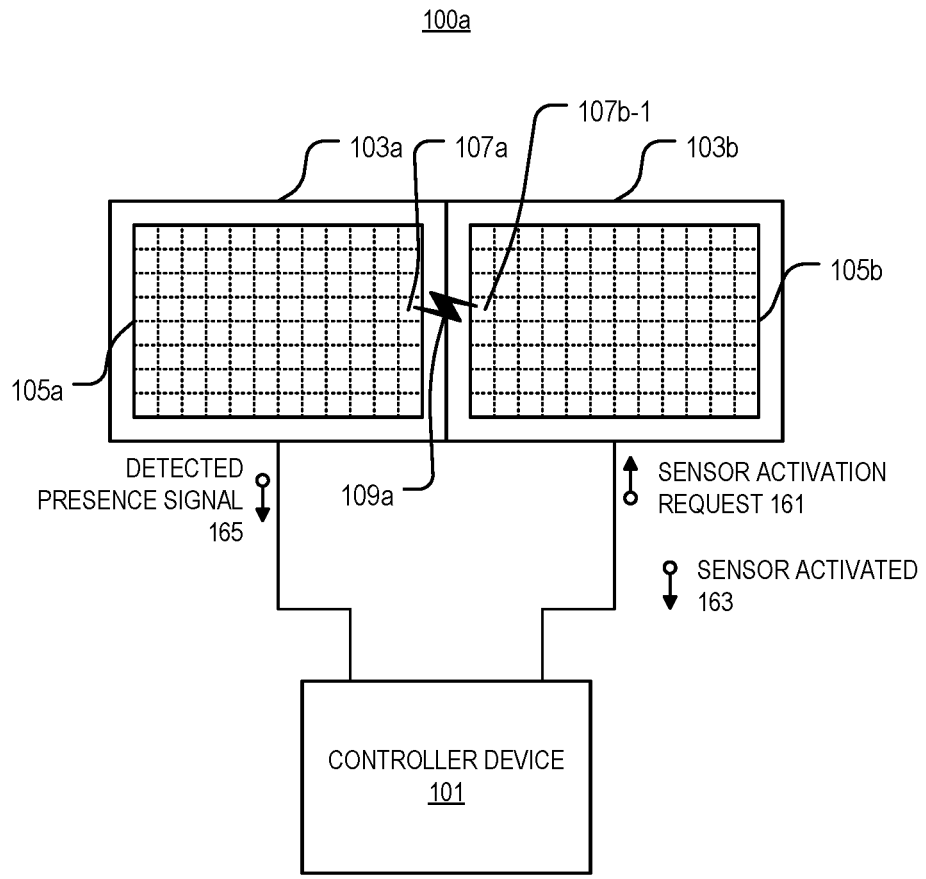
FIGS. 1A-B illustrate embodiments of a system of conducting automatic screen mapping in accordance with various aspects as described herein.

For simplicity and illustrative purposes, the present disclosure is described by referring mainly to exemplary embodiments thereof. In the following description, numerous specific details are set forth in order to provide a thorough understanding of the present disclosure. However, it will be readily apparent to one of ordinary skill in the art that the present disclosure may be practiced without limitation to these specific details.

Screen mapping systems provide techniques and mechanisms for determining the spatial arrangement of each display in a set of displays relative to the other displays in the set, where the displays in the set are spatially arranged in a geometric space and each display in the set of displays is adjacent to at least one other display in the set. Current screen mapping systems include an external controller having optical sensors that are manually placed on the side of each display of the set to detect the spatial arrangement of each display in the set. Further, the external controller may require an installer to manually specify where on a grid each display is positioned. Once the installation is completed, the installer then has to manually remove each optical sensor from the corresponding display. A screen mapping system that automatically configures the spatially arranged displays would be substantially more efficient and cost effective. Accordingly, improvements described herein include a controller device that leverages an inherent attribute of certain display devices to determine the spatial arrangement of each display device relative to the other display devices.

To resolve, in one exemplary embodiment, after the display devices (e.g., capacitive touchscreen displays/monitors) are spatially arranged and installed such as on a wall or a monitor stand operable to hold multiple displays, the display devices can be coupled to the same controller device over wired connections (e.g., USB, HDMI, or DVI connectors) or wireless connections (e.g., WiFi, Bluetooth). Each display device can include a screen structure having a set of presence sensitive sensors (e.g., capacitive touch sensors) such as configured in a grid structure. In one example, the screen structure is a projected capacitive (PCAP) touch screen structure. Further, each display device can include an integrated presence sensitive controller device (e.g., touch controller device) operable, for instance, to scan a grid structure of presence sensitive sensors to detect a presence signal (e.g., finger or stylus touch, electromagnetic signal) and determine the corresponding location on the sensor grid structure of the detected presence signal. The presence sensitive controller device can be operable to drive a presence sensitive sensor with a time varying signal (e.g., sinusoid, square wave, triangle wave, impulse wave) so that a presence signal (e.g., electromagnetic signal) can be radiated from that sensor. The power of a time varying signal that drives a presence sensitive sensor can be adjusted (such as by the controller device) so as to increase or decrease the energy of the presence signal radiated by that sensor.

Figure 1B:
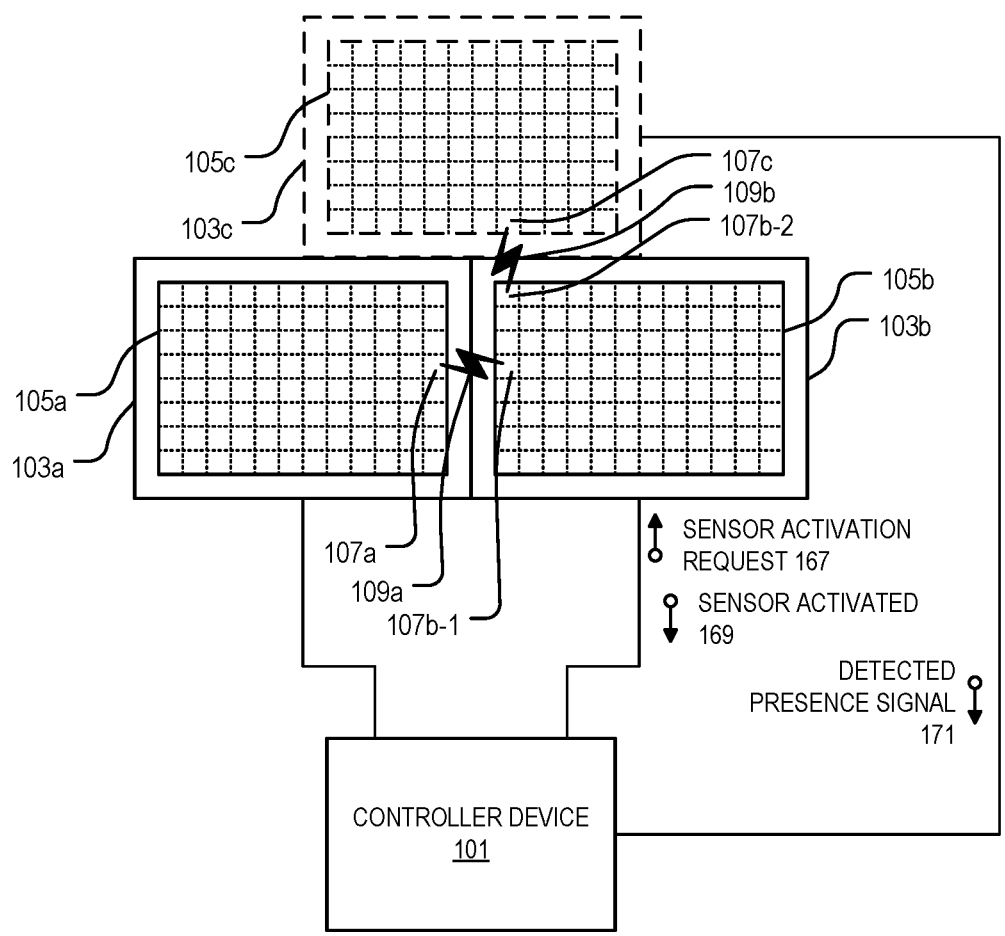
Figure 3A:
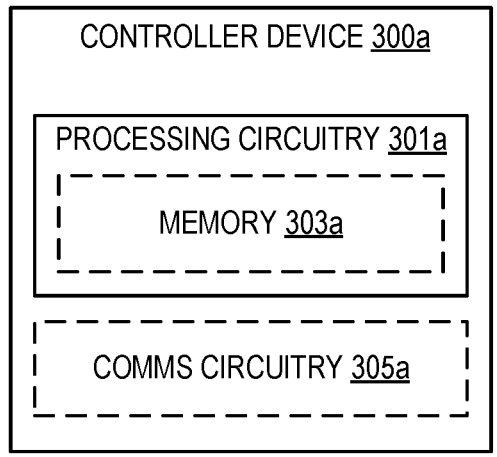
FIG. 3A illustrates another embodiment of a controller device in accordance with various aspects as described herein.
Figure 3B:
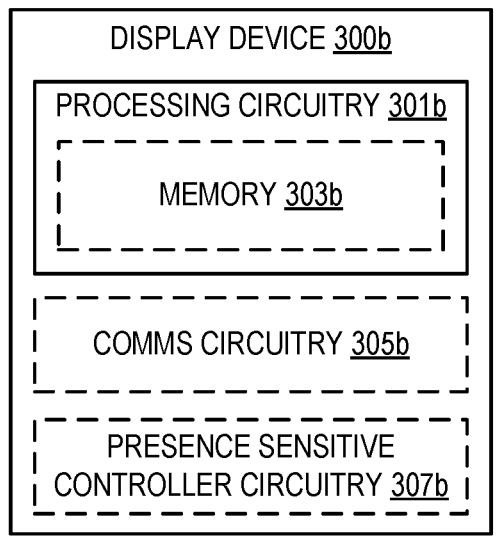
FIG. 3B illustrates another embodiment of a display device in accordance with various aspects as described herein.

Furthermore, the controller device can establish wired or wireless communications with each display device and can then initiate detection of the spatial arrangement of the display devices by sending, to a first display device, an indication that includes a request to activate a certain presence sensitive sensor of the screen structure of that display device so that the integrated presence sensitive controller device can drive the certain presence sensitive sensor with a time varying signal so as to radiate a presence signal from that sensor. The controller can then receive, from a second display device that is spatially arranged adjacent to the first display device, an indication that the second display device detected the radiated presence signal. The controller device can then determine the spatial arrangement of the first and second display devices based on this received detection. In addition, the controller device is then operable to control how images are segmented and displayed on the first and second display devices The exemplary embodiments described herein further include improved techniques to conduct automatic screen mapping of spatially arranged display devices. In one example, FIGS. 1A-B illustrate embodiments of a system 100a-b of conducting automatic screen mapping in accordance with various aspects as described herein. In FIGS. 1A-B, the system 100a-b includes a controller device 101 operationally coupled to a set of display devices 103a-c over a wired connection (e.g., USB, HDMI, or DVI connection) or wireless connection (e.g., WiFi or Bluetooth connection). Each display device 103a-c can include a presence sensitive screen structure 105a-c (e.g., capacitive touch screen) with each screen structure 105a-c being represented by a set of presence sensitive sensors 107a-c. In one example, each screen structure 105a-c includes a grid structure of the set of presence sensitive sensors 107a-c (e.g., projective capacitive (PCAP) touchscreen sensors) that are operable to maintain a standing electrical charge across each sensor that extends through to a corresponding contact surface of the touchscreen. Further, any changes in the electrical charge caused by the proximity of other capacitive bodies (e.g., touch stylus, fingers etc.) or electromagnetic signals can be detected by the corresponding display device 103a-c. Each display device 103a-c can be operable to activate a presence sensitive sensor 107a-c of the corresponding presence sensitive screen structure 105a-c by driving that sensor 107a-c with a time varying signal (e.g., sinusoid, square wave, triangle wave) so as to radiate a presence signal 109a-b (e.g., electromagnetic signal) from that sensor 107a-c. In one example, a touch controller device integrated with each display device 103a-c is operationally coupled to the set of presence sensitive sensors 107a-c and operable to drive each sensor 107a-c with a time-varying signal so as to radiate a presence signal 109a-b from that sensor 107a-c. The display devices 103a-c can be spatially arranged in a two or three dimensional space so that each display device 103a-c is positioned adjacent to another display device 103a-c in the two or three dimensional space. For example, as illustrated by FIG. 3A, the display devices 103a-b are spatially arranged adjacent each other in a two-dimensional space with the right side perimeter of the display device 103a being adjacent to the left side perimeter of the display device 103b. In another example, as illustrated by FIG. 3B, the display devices 103a-c are spatially arranged adjacent each other in a two-dimensional space with the right side perimeter of the display device 103a being adjacent to the left side perimeter of the display device 103b and portions of each top perimeter of the display devices 103a-b being adjacent to the bottom perimeter of the display device 103c. In another example, the display devices can be spatially arranged in a three-dimensional space so that they are adjacent each other in the three-dimensional space.

In FIGS. 1A-B, the controller device 101 is operable to obtain a characteristic (e.g., display identifier, display type, resolution, aspect ratio, orientation, pixel dimension, display dimension) of each display device 103a-c. In one example, a display device 103a-c can send, to the controller device 101, an indication that includes a characteristic of that display device 103a-c. In another example, the controller device 103 can send, to a display device 107a-c, an indication that includes a request for a characteristic of that display device 107a-b and in response, the display device 107a-c can send, to the controller device 101, an indication that includes the characteristic of that display device 107a-c.

In FIG. 1A, in operation, after the display devices 103a-c are spatially arranged in a two or three dimensional space, the controller device 101 can determine to request to activate a presence sensitive sensor 107b-1 of the screen structure 105b of the display device 103b so as to radiate a presence signal 109a from that sensor 107b-1. The controller device 101 can then send, to the display device 103b, an indication 161 that includes the request to activate the certain presence sensitive sensor 107b-1. The indication 161 can include information associated with the location of the presence sensitive sensor 107b-1 on the screen structure 105b from which the presence signal 109a is to be radiated. The display device 103b can receive the request indication 161 and can determine to activate the presence sensitive sensor 107b-1 based on the request. The display device 103b can then activate the presence sensitive sensor 107b-1 such as by driving that sensor 107b-1 with a time varying signal (e.g., sinusoid, square wave, triangle wave, impulse wave) so as to radiate the presence signal 109a (e.g., electromagnetic signal) from that sensor 107b-1. The display device 103b can send, to the controller device 101, an indication 163 that includes an acknowledgement that the presence sensitive sensor 107b-1 of the screen structure 105b was activated.

In the current embodiment, the display device 107a can detect the radiated presence signal 109a at a presence sensitive sensor 107a of the screen structure 105a. Further, the display device 107a can obtain or determine a location of the presence sensitive sensor 107a on the screen structure 107a that detected the radiated presence signal 109a. The display device 107a can then send, to the controller device 101, an indication 165 that the display device 107a detected a presence signal. The indication 165 can also include information associated with the location of the presence sensitive sensors 107a on the screen structure 105a that detected a presence signal. The controller device 101 can receive the indication 165 and can determine the spatial arrangement of the display devices 103a-b based on the information associated with the location of the presence sensitive sensor 107b-1 on the screen structure 105b from which the presence signal 109a was radiated and the information associated with the location of the presence sensitive sensor 107a on the screen structure 105a that detected a presence signal.

In FIG. 1B, the system 100b includes a third display device 103c in addition to those of FIG. 1A. In operation, the controller device 101 can determine to request to activate a presence sensitive sensor 107b-2 of the screen structure 105b of the display device 103b so as to radiate a presence signal 109b from that sensor 107b-2. The controller device 101 can then send, to the display device 103b, an indication 167 that includes the request to activate the presence sensitive sensor 107b-2. The indication 161 can include information associated with the location of the presence sensitive sensor 107b-2 on the screen structure 105b from which the presence signal 109b is to be radiated. The display device 103b can receive the request indication 167 and can determine to activate the presence sensitive sensor 107b-2 based on the request. The display device 103b can then activate the presence sensitive sensor 107b-2 such as by driving that sensor 107b-2 with a time varying signal (e.g., sinusoid, square wave, triangle wave, impulse wave) so as to radiate the presence signal 109b (e.g., electromagnetic signal) from that sensor 107b-2. The display device 103b can send, to the controller device 101, an indication 169 that includes an acknowledgement that the presence sensitive sensor 107b-2 of the screen structure 105b was activated.

In the current embodiment, the display device 107c can detect the radiated presence signal 109b at a presence sensitive sensor 107c of the screen structure 105c. Further, the display device 107c can obtain or determine a location of the presence sensitive sensor 107c on the screen structure 107c that detected the radiated presence signal 109b. The display device 107c can then send, to the controller device 101, an indication 171 that the display device 107c detected a radiated presence signal. The indication 171 can also include information associated with the location of the presence sensitive sensors 107c on the screen structure 105c that detected the radiated presence signal 109b. The controller device 101 can receive the indication 171 and can determine the spatial arrangement of the display devices 103a-c based on the information associated with the locations of the presence sensitive sensors 107b-1, 107b-2 on the screen structure 105b of the display device 103b from which the presence signals 109a-b were radiated and the information associated with the locations of the presence sensitive sensors 107a, 107c on the screen structures 105a,c of the display devices 103a,c that detected a presence signal.

Figure 2A:
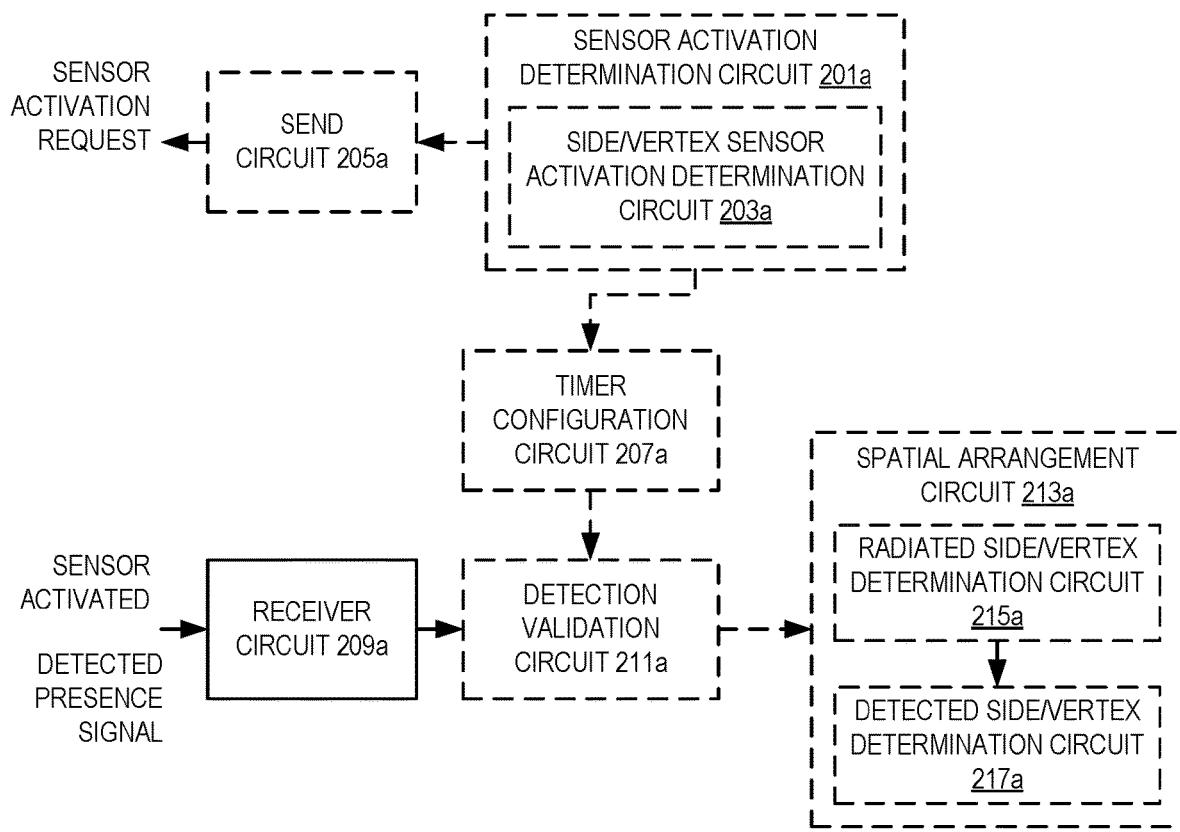
FIG. 2A illustrates one embodiment of a controller device in accordance with various aspects as described herein.

FIG. 2A illustrates one embodiment of a controller device 200a in accordance with various aspect as described herein. In FIG. 2A, the controller device 200a implements various functional means, units, or modules (e.g., via the processing circuitry 301a in FIG. 3A, via the processing circuitry 501 in FIG. 5, via software code, or the like), or circuits. In one embodiment, these functional means, units, modules, or circuits (e.g., for implementing the method(s) described herein) may include for instance: a sensor activation determination circuit 201a operable to determine to activate a presence sensitive sensor of a screen structure of a display device so as to radiate a presence signal from that sensor; a side or vertex sensor activation determination circuit 203a operable to determine to activate a presence sensitive sensor of a screen structure that is associated with a side or a vertex of that screen structure; a send circuit 205a operable to send information; a time configuration circuit 207a operable to initiate a timer associated with determining that the detection of the radiated presence signal is within a certain time period after the presence signal is radiated; a receiver circuit 209a operable to receive information; a spatial arrangement circuit 213a operable to determine the spatial arrangement of the display devices; a radiated side/vertex determination circuit 215a operable to determine a side or a vertex of a display device from which a presence sensitive sensor of a screen structure of that display device will radiate a presence signal; and a detected side/vertex determination circuit 217a operable to determine a side or a vertex of a display device by which a presence sensitive sensor of a screen structure of that display device detected a presence signal.

Figure 2B:
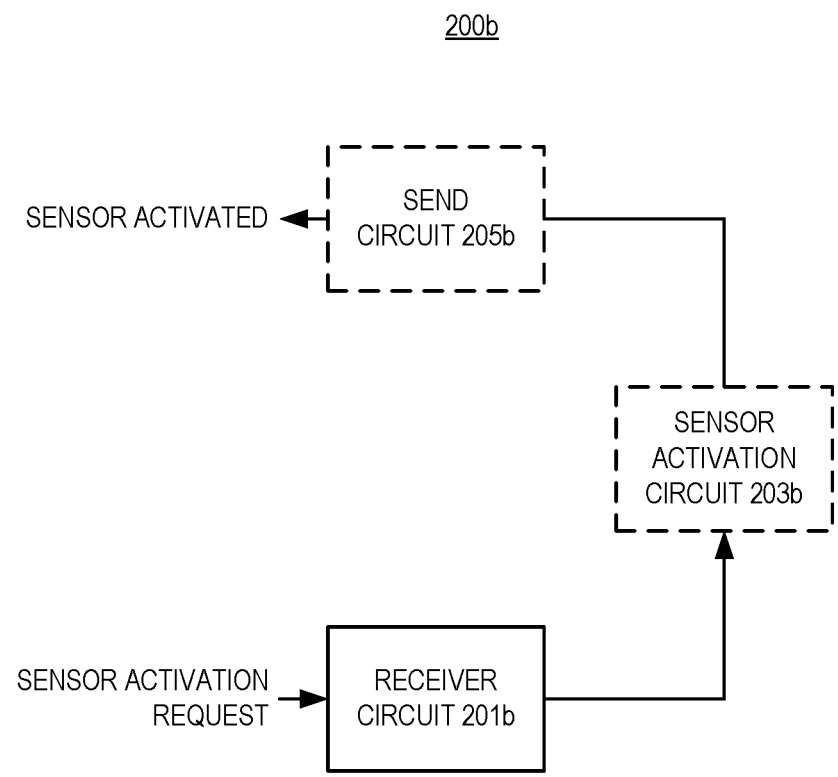
FIGS. 2B-C illustrate embodiments of a display device in accordance with various aspects as described herein.

FIG. 2B illustrates one embodiment of a display device 200b in accordance with various aspects as described herein. In FIG. 2B, the display device 200b implements various functional means, units, or modules (e.g., via the processing circuitry 301b in FIG. 3B, via software code, or the like), or circuits. In one embodiment, these functional means, units, modules, or circuits (e.g., for implementing the method(s) herein) may include for instance: a receiver circuit 201b operable to receive information; a sensor activation circuit 203b operable to activate a presence sensitive sensor of a screen structure of the display device 200b so as to radiate a presence signal from that presence sensitive sensor; a send circuit 205b operable to send information.

Figure 2C:
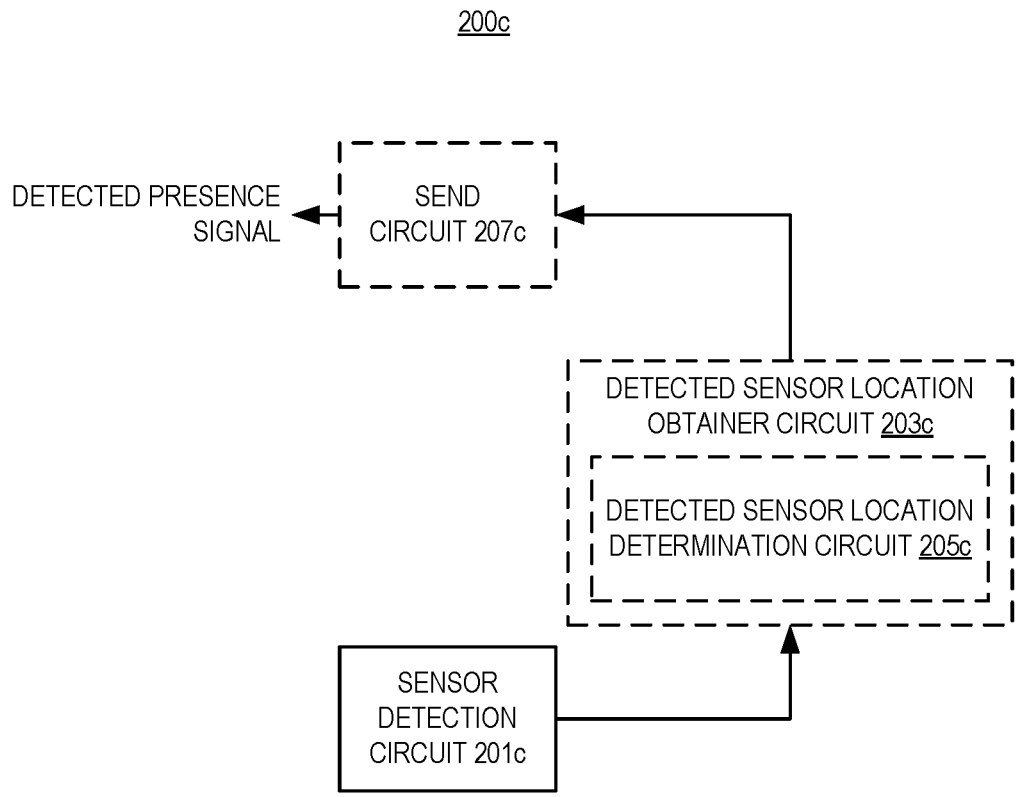

FIG. 2C illustrates another embodiment of a display device 200c in accordance with various aspects as described herein. In FIG. 2C, the display device 200c implements various functional means, units, or modules (e.g., via the processing circuitry 301b in FIG. 3B, via software code, or the like), or circuits. In one embodiment, these functional means, units, modules, or circuits (e.g., for implementing the method(s) herein) may include for instance: a sensor detection circuit 201c operable to determine that a presence sensitive sensor of a screen structure of the display device 200c detected a presence signal; a detected sensor location obtainer circuit 203c operable to obtain information associated with a location on a screen structure of the display device 200c in which a presence sensitive sensor detected a presence signal; a detected sensor location determination circuit 205c operable to determine a location on a screen structure of the display device 200c in which a presence sensitive sensor detected a presence signal.

FIG. 3A illustrates another embodiment of a controller device 300a in accordance with various aspects as described herein. In FIG. 3A, the device 300a may include processing circuitry 301a that is operably coupled to one or more of the following: memory 303a and network communications circuitry 305a, the like, or any combination thereof. The network communication circuitry 305a is configured to transmit and/or receive information to and/or from one or more other network node devices via any communication technology. The processing circuitry 301a is configured to perform processing described herein, such as by executing instructions stored in memory 303a. The processing circuitry 301a in this regard may implement certain functional means, units, or modules.

FIG. 3B illustrates another embodiment of a display device 300b in accordance with various aspects as described herein. In FIG. 3B, the device 300b may include processing circuitry 301b that is operably coupled to one or more of the following: memory 303b, network communications circuitry 305b, presence sensitive controller circuitry 307b, the like, or any combination thereof. The network communication circuitry 305b is configured to transmit and/or receive information to and/or from one or more other network node devices via any communication technology. The processing circuitry 301b is configured to perform processing described herein, such as by executing instructions stored in memory 303b. The processing circuitry 301b in this regard may implement certain functional means, units, or modules. The presence sensitive controller circuitry 307b can be associated with a presence-sensitive screen structure of the display device 300b and can be operable to detect a presence signal at and to radiate a presence signal from any in the set of presence sensitive sensors of the screen structure of the display device 300b.

Figure 4A:
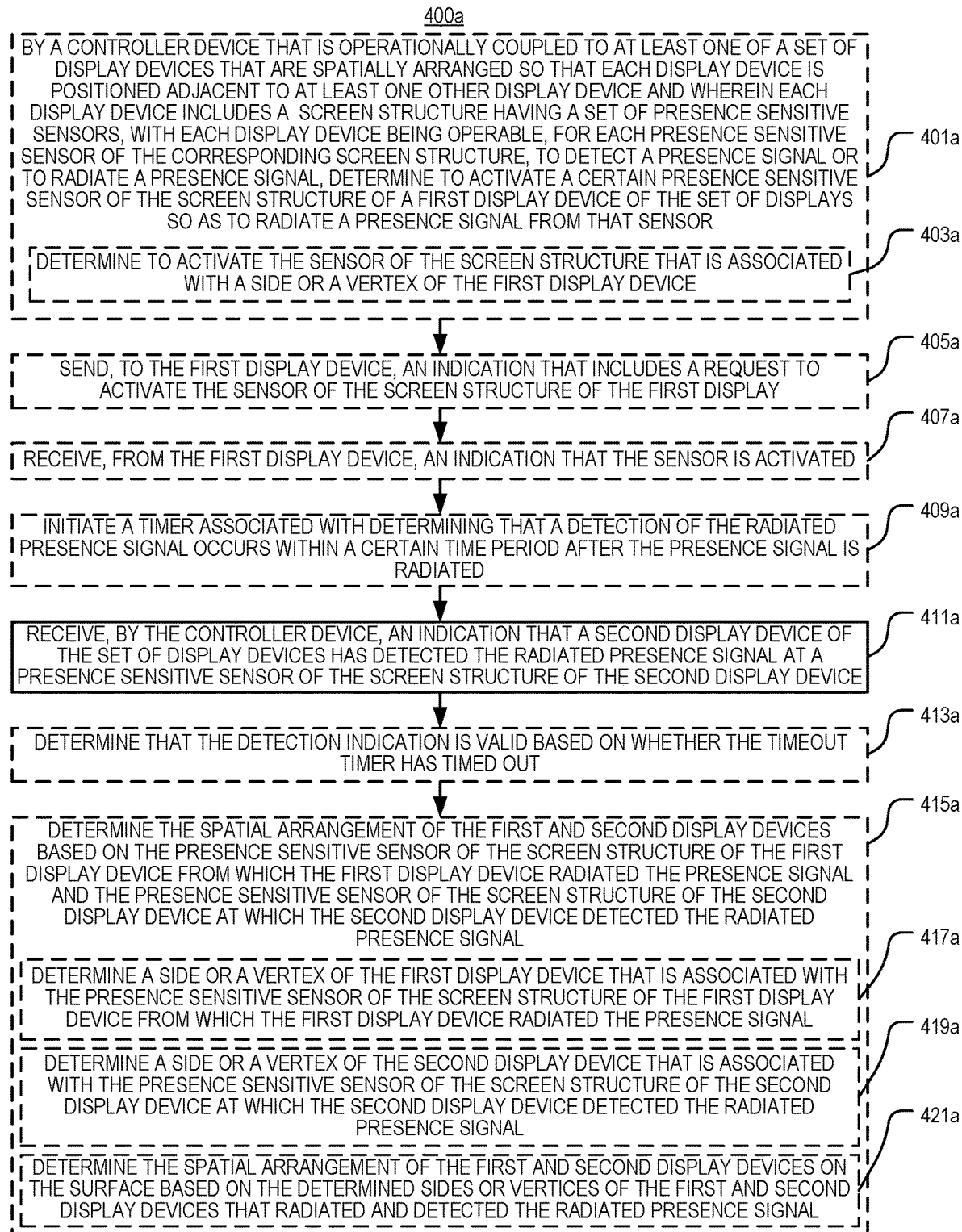
FIG. 4A illustrates one embodiment of a method performed by a controller device of conducting automatic screen mapping in accordance with various aspects as described herein.

FIG. 4A illustrates one embodiment of a method 400a performed by a controller device 101, 200a, 300a, 500 of conducting automatic screen mapping in accordance with various aspects as described herein. In FIG. 4A, the method 400a may start, for instance, at block 401a where it may include determining to activate a presence sensitive sensor of the screen structure of a first display device of the set of display devices so as to radiate a presence signal from that sensor. At block 403a, the step of block 401a may further include determining to activate the presence sensitive sensor of the screen structure that is associated with a side or a vertex of the first display device. At block 405a, the method 400a may include sending to the first display device an indication that includes a request to activate the presence sensitive sensor of the screen structure of the first display device. At block 407a, the method 400a may include receiving from the first display device an indication that the presence sensitive sensor is activated. At block 409a, the method 400a may include initiating a timer associated with determining that a detection of the radiated presence signal occurs within a certain time period after the presence signal is radiated. At block 411a, the method 400a includes receiving an indication that the second display device of the set of display devices has detected the radiated presence signal at a presence sensitive sensor of the screen structure of the second display device. At block 413*a*, the method 400*a* may include determining that the detection indication is valid based on whether the timeout timer has timed out. At block 415*a*, the method may include determining the spatial arrangement of the first and second display devices based on the presence sensitive sensor of the screen structure of the first display device from which the first display device radiated the presence signal and the second display device at which detected the radiated presence signal. At block 417*a*, the method 400*a* may further include determining a side or vertex of the first display device that is associated with the presence sensitive sensor of the screen structure of the first display device from which the first display device radiated the presence signal. At block 419*a*, the method 400*a* may further include determining a side or vertex of the second display device that is associated with the presence sensitive sensor of the screen structure of the second display device at which the second display device detected the radiated presence signal. At block 421*a*, the method 400*a* may further include determining the spatial arrangement of the first and second display devices on the surface based on the determined sides or vertices of the first and second display devices that radiated and detected the presence signal.

Figure 4B:
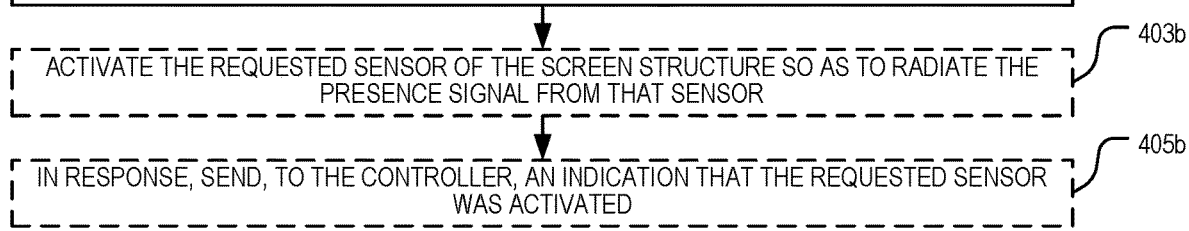
FIGS. 4B-C illustrate other embodiments of a method performed by a display device of conducting automatic screen mapping in accordance with various aspects as described herein.

FIG. 4B illustrates another embodiment of a method 400*b* performed by a display device 103*a-b*, 200*b-c*, 500 of conducting automatic screen mapping in accordance with various aspects as described herein. In FIG. 4B, the method 400*b* may start, for instance, at block 401*b* where it includes receiving, from a controller device operationally coupled to the display device, an indication that includes a request to activate radiation of a presence signal from a certain presence sensitive sensor of the screen structure of the display device. At block 403*b*, the method 400*b* may further include activating that requested sensor so as to radiate the presence signal from that requested sensor. In response, the method 400*b* may further include sending, to the controller device, an indication that the request sensor was activated, as represented by block 405*b*.

Figure 4C:
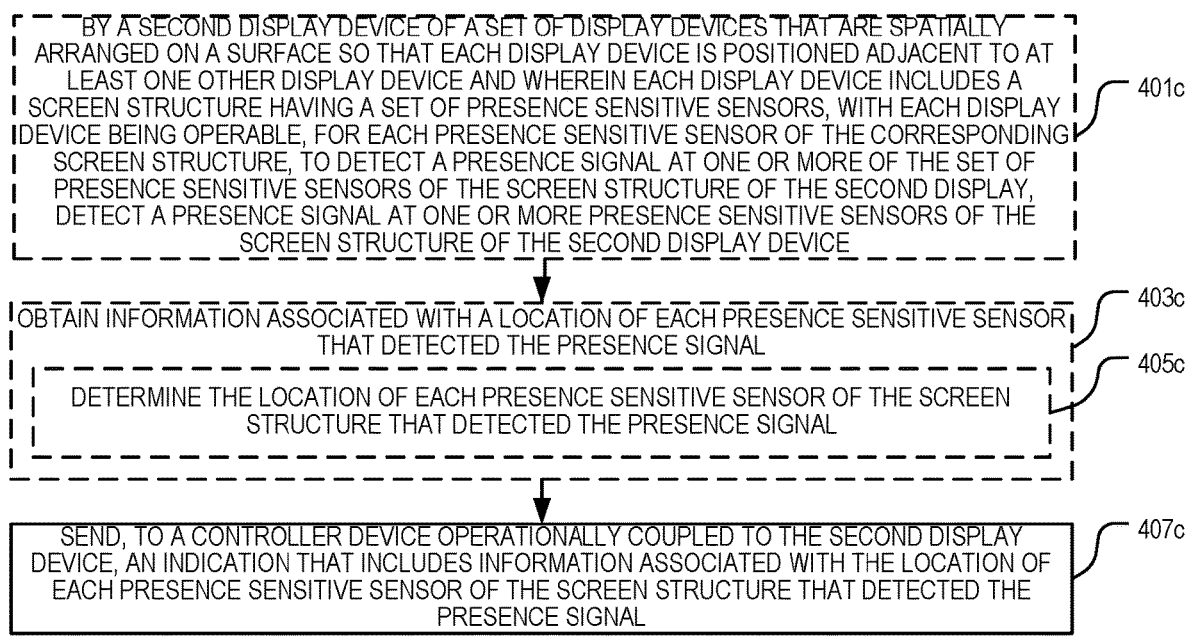

FIG. 4C illustrates another embodiment of a method performed by a display device of automatic screen mapping in accordance with various aspects as described herein. In FIG. 4C, the method 400*c* may start, for instance, at block 401*c* where it may include detecting a presence signal at one or more presence sensitive sensors of the screen structure of the display device. At block 403*c*, the method 400*c* may further include obtaining the location of each presence sensitive sensor that detected the presence signal. At block 405*c*, the method 400*c* may further include determining the location of each presence sensitive sensor that detected the presence signal. At block 407*c*, the method 400*c* further includes sending to a controller device operationally coupled to the display device an indication that includes a location of each presence sensitive sensor that detected the presence signal.

Figure 5:
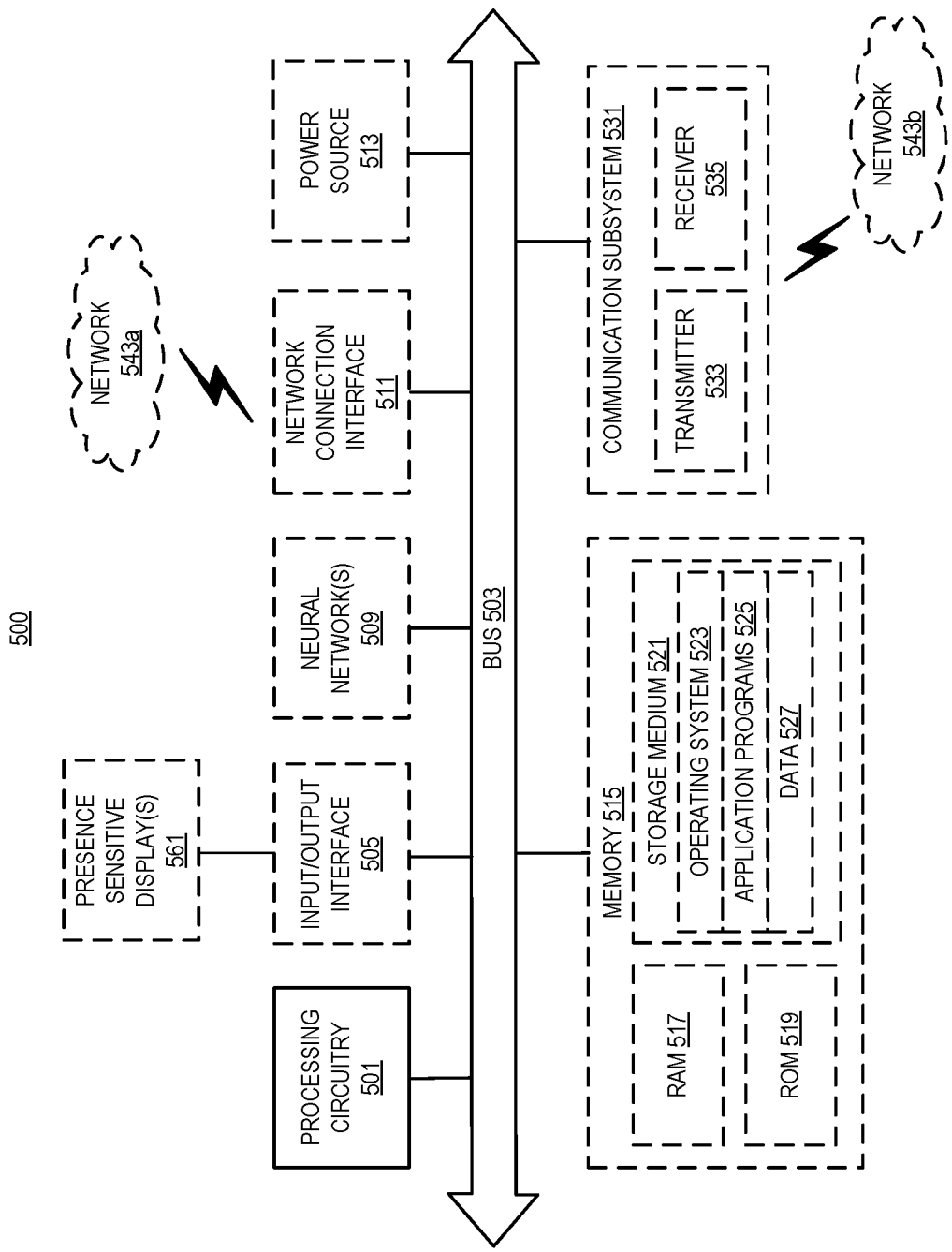
FIG. 5 illustrates another embodiment of a controller device or a display device in accordance with various aspects as described herein.

FIG. 5 illustrates another embodiment of a controller device or a display device 500 in accordance with various aspects as described herein. In FIG. 5, device 500 includes processing circuitry 501 that is operatively coupled to input/output interface 505, neural network circuit 509, network connection interface 511, power source 513, memory 515 including random access memory (RAM) 517, read-only memory (ROM) 519 and storage medium 521, communication subsystem 531, and/or any other component, or any combination thereof.

The input/output interface 505 may be configured to provide a communication interface to an input device, output device, or input and output device. The device 500 may be configured to use an output device via input/output interface 505. An output device may use the same type of interface port as an input device. For example, a USB port, an HDMI port, a DVI port, a WiFi port, or a Bluetooth port may be used to provide input to and output between the device 500 and one or more presence sensitive displays 561 (e.g., touchscreen displays). The output device may be a speaker, a sound card, a video card, a display, a monitor, a printer, an actuator, an emitter, a smartcard, another output device, or any combination thereof. The device 500 may be configured to use an input device via input/output interface 505 to allow a user to capture information into the device 500. The input device may include a touch-sensitive or presence-sensitive display, an optical sensor, (e.g., a digital camera, a digital video camera, a web camera, a scanner, etc.), a scanner, a weight scale, a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical or image sensor, an infrared sensor, a proximity sensor, another like sensor, or any combination thereof. As shown in FIG. 5, the input/output interface 505 can be configured to provide a communication interface (e.g., USB, HDMI, DVI, Bluetooth, WiFi) to various input/output components such as one or more presence sensitive display devices 561.

In FIG. 5, storage medium 521 may include operating system 523, application program 525, data 527, resolution data 529, the like, or any combination thereof. In other embodiments, storage medium 521 may include other similar types of information. Certain devices may utilize all of the components shown in FIG. 5, or only a subset of the components. The level of integration between the components may vary from one device to another device. Further, certain devices may contain multiple instances of a component, such as multiple processors, memories, neural networks, network connection interfaces, transceivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In FIG. 5, the neural network circuit 509 may be configured to learn to perform tasks by considering examples such as performing object detection of certain objects in an image. In one example, a first neural network circuit is configured to perform object detection of persons in an image. For example, the neural network circuit 509 may use image data to detect the number of people in a self-checkout queue. In FIG. 5, the network connection interface 511 may be configured to provide a communication interface to network 543*a*. The network 543*a* may encompass wired and/or wireless networks such as a local-area network (LAN), a wide-area network (WAN), a computer network, a wireless network, a telecommunications network, another like network or any combination thereof. For example, network 543a may comprise a Wi-Fi network. The network connection interface 511 may be configured to include a receiver and a transmitter interface used to communicate with one or more other devices over a communication network according to one or more communication protocols, such as Ethernet, TCP/IP, SONET, ATM, or the like. The network connection interface 511 may implement receiver and transmitter functionality appropriate to the communication network links (e.g., optical, electrical, and the like). The transmitter and receiver functions may share circuit components, software or firmware, or alternatively may be implemented separately.

The RAM 517 may be configured to interface via a bus 503 to the processing circuitry 501 to provide storage or caching of data or computer instructions during the execution of software programs such as the operating system, application programs, and device drivers. The ROM 519 may be configured to provide computer instructions or data to processing circuitry 501. For example, the ROM 519 may be configured to store invariant low-level system code or data for basic system functions such as basic input and output (I/O), startup, or reception of keystrokes from a keyboard that are stored in a non-volatile memory. The storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, the storage medium 521 may be configured to include an operating system 523, an application program 525 such as web browser, web application, user interface, browser data manager as described herein, a widget or gadget engine, or another application, and a data file 527. The storage medium 521 may store, for use by the device 500, any of a variety of various operating systems or combinations of operating systems.

The storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. The storage medium 521 may allow the device 500a-b to access computer-executable instructions, application programs or the like, stored on transitory or non-transitory memory media, to off-load data, or to upload data. An article of manufacture, such as one utilizing a communication system may be tangibly embodied in the storage medium 521, which may comprise a device readable medium.

The processing circuitry 501 may be configured to communicate with network 543b using the communication subsystem 531. The network 543a and the network 543b may be the same network or networks or different network or networks. The communication subsystem 531 may be configured to include one or more transceivers used to communicate with the network 543b. For example, the communication subsystem 531 may be configured to include one or more transceivers used to communicate with one or more remote transceivers of another device capable of wireless communication according to one or more communication protocols, such as IEEE 802.11, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software, or firmware, or alternatively may be implemented separately.

In FIG. 5, the communication functions of the communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 531 may include cellular communication, Wi-Fi communication, Bluetooth communication, and GPS communication. The network 543b may encompass wired and/or wireless networks such as a local-area network (LAN), a wide-area network (WAN), a computer network, a wireless network, a telecommunications network, another like network or any combination thereof. For example, the network 543b may be a cellular network, a Wi-Fi network, and/or a near-field network. The power source 513 may be configured to provide alternating current (AC) or direct current (DC) power to components of the device 500a-b.

The features, benefits and/or functions described herein may be implemented in one of the components of the device 500 or partitioned across multiple components of the device 500. Further, the features, benefits, and/or functions described herein may be implemented in any combination of hardware, software, or firmware. In one example, communication subsystem 531 may be configured to include any of the components described herein. Further, the processing circuitry 501 may be configured to communicate with any of such components over the bus 503. In another example, any of such components may be represented by program instructions stored in memory that when executed by the processing circuitry 501 perform the corresponding functions described herein. In another example, the functionality of any of such components may be partitioned between the processing circuitry 501 and the communication subsystem 531. In another example, the non-computationally intensive functions of any of such components may be implemented in software or firmware and the computationally intensive functions may be implemented in hardware.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts for illustrative purposes, but the embodiments are similarly applicable in other contexts not explicitly described.

In one exemplary embodiment, a method is performed by a controller device that is coupled to at least one of a set of display devices that are spatially arranged on a surface so that each display device is positioned adjacent to at least one other display device and wherein each display device includes a screen structure having a set of presence sensitive sensors. Each display device is operable, for each presence sensitive sensor of the corresponding screen structure, to detect a presence signal and to radiate a presence signal. The method includes receiving an indication that a second display device of the set of display devices has detected a presence signal radiated from a presence sensitive sensor of the screen structure of a first display device of the set of display devices so as to determine a spatial arrangement of the first and second display devices.

In another exemplary embodiment, the method further includes determining to activate the presence sensitive sensor of the screen structure that is associated with a side or vertex of the first display device so as to radiate the presence signal from that sensor.

In another exemplary embodiment, the method further includes initiating a timer associated with determining that a detection of the radiated presence signal is within a certain time period after the presence signal is radiated. The method further includes receiving, by the controller device, an indication that the second display device has detected the radiated presence signal at a presence sensitive sensor of the screen structure of the second display device. In response to determining that the presence signal is detected in the certain time period based on the timer, the method further includes determining the spatial arrangement of the first and second display devices on the surface based on the presence sensitive sensor of the screen structure of the first display device from which the first display device radiated the presence signal and the presence sensitive sensor of the screen structure of the second display device at which the second display device detected the radiated presence signal.

In another exemplary embodiment, the method further includes sending, by the controller device, to the first display device, an indication that includes a request to activate the presence sensitive sensor of the screen structure of the first display device.

In another exemplary embodiment, the method further includes receiving, by the controller device, from the first display device, an indication that the presence sensitive sensor is activated.

In another exemplary embodiment, the method further includes determining the spatial arrangement of the first and second display devices on the surface based on the presence sensitive sensor of the screen structure of the first display device from which the first display device radiated the presence signal and the presence sensitive sensor of the screen structure of the second display device at which the second display device detected the radiated presence signal.

In another exemplary embodiment, the method further includes determining a side or a vertex of the first display device that is associated with the presence sensitive sensor of the screen structure of the first display device from which the first display device radiated the presence signal.

In another exemplary embodiment, the method further includes determining a side or a vertex of the second display device that is associated with the presence sensitive sensor of the screen structure of the second display device at which the second display device detected the radiated presence signal.

In another exemplary embodiment, the method further includes determining a side or a vertex of the first display device that is associated with the presence sensitive sensor of the screen structure of the first display device from which the first display device radiated the presence signal; determining a side or a vertex of the second display device that is associated with the presence sensitive sensor of the screen structure of the second display device at which the second display device detected the radiated presence signal; and determining the spatial arrangement of the first and second display devices on the surface based on the determined sides or vertices of the first and second display devices that radiated and detected the radiated presence signal.

In another exemplary embodiment, the method is further defined by having the screen structure of each display device include a capacitive touch screen.

In another exemplary embodiment, the method is further defined by having the indication received by the controller device further include the properties and dimensions of the shape of the screen structure of the second display device.

In one exemplary embodiment, a controller device comprises a controller device coupled to at least one of a set of displays that are spatially arranged on a surface so that each display device is positioned adjacent to at least one other display device and wherein each display device includes a screen structure having a set of presence sensitive sensors, with each display device being operable, for each presence sensitive sensor of the corresponding screen structure, to detect a presence signal and to radiate a presence signal; and the controller device further comprises a processor and a memory, with the memory containing instructions executable by the processor whereby the processor is configured to receive an indication that a second display device of the set of display devices has detected a presence signal radiated from a presence sensitive sensor of the screen structure of a first display device of the set of display devices so as to determine a spatial arrangement of the first and second display devices.

In another exemplary embodiment, the memory of the controller device contains further instructions executable by the processor whereby the processor is further configured to determine to activate the presence sensitive sensor of the screen structure that is associated with a side or vertex of the first display device so as to radiate the presence signal from that sensor.

In another exemplary embodiment, the memory of the controller device contains further instructions executable by the processor whereby the processor is further configured to initiate a timer associated with determining that a detection of the radiated presence signal is within a certain time period after the presence signal is radiated; receive, an indication that the second display device has detected the radiated presence signal at a presence sensitive sensor of the screen structure of the second display device; and in response to determining that the presence signal is detected in the certain time period based on the timer, determine the spatial arrangement of the first and second display devices on the surface based on the presence sensitive sensor of the screen structure of the first display device from which the first display device radiated the presence signal and the presence sensitive sensor of the screen structure of the second display device at which the second display device detected the radiated presence signal.

In another exemplary embodiment, the memory of the controller device contains further instructions executable by the processor whereby the processor is further configured to send, to the first display device, an indication that includes a request to activate the presence sensitive sensor of the screen structure of the first display device.

In another exemplary embodiment, the memory of the controller device contains further instructions executable by the processor whereby the processor is further configured to receive, from the first display device, an indication that the presence sensitive sensor is activated.

In another exemplary embodiment, the memory of the controller device contains further instructions executable by the processor whereby the processor is further configured to determine the spatial arrangement of the first and second display devices on the surface based on the presence sensitive sensor of the screen structure of the first display device from which the first display device radiated the presence signal and the presence sensitive sensor of the screen structure of the second display device at which the second display device detected the radiated presence signal.

In another exemplary embodiment, the memory of the controller device contains further instructions executable by the processor whereby the processor is further configured to determine a side or a vertex of the first display device that is associated with the presence sensitive sensor of the screen structure of the first display device from which the first display device radiated the presence signal, determine a side or a vertex of the second display device that is associated with the presence sensitive sensor of the screen structure of the second display device at which the second display device detected the radiated presence signal, and determine the spatial arrangement of the first and second display devices on the surface based on the determined sides or vertices of the first and second display devices that radiated and detected the radiated presence signal.

In another exemplary embodiment, the screen structure of each display device coupled to the controller device includes a capacitive touch screen.

In another exemplary embodiment, the indication received by the controller device further includes the properties and dimensions of the shape of the screen structure of the second display device.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, comprising:
by a controller device that is coupled to each of a set of display devices that are spatially arranged so that each display device is positioned adjacent at least one other display device and wherein each display device includes a screen structure having a set of presence sensitive sensors, with each display device being operable, for each presence sensitive sensor of a corresponding screen structure, to detect a presence signal and to radiate a presence signal,
initiating a timer associated with determining that a detection of the radiated presence signal is within a certain time period after the presence signal is radiated;
receiving an indication that a second display device of the set of display devices has detected a presence signal radiated from a presence sensitive sensor of a screen structure of a first display device of the set of display devices at a presence sensitive sensor of a screen structure of the second display device; and
in response to determining that the presence signal radiated from the presence sensitive sensor of the screen structure of the first display device is detected in the certain time period based on the timer, determining a spatial arrangement of the first and second display devices on a surface based on a location of the presence sensitive sensor on the screen structure of the first display device from which the first display device radiated the presence signal and a location of the presence sensitive sensor on the screen structure of the second display device at which the second display device detected the radiated presence signal.

2. The method of claim 1, further comprising:
determining to activate the presence sensitive sensor of the screen structure that is associated with a side or vertex of the first display device to radiate the presence signal from that presence sensitive sensor.

3. The method of claim 1, further comprising:
sending, by the controller device, to the first display device, an indication that includes a request to activate the presence sensitive sensor of the screen structure of the first display device.

4. The method of claim 3, further comprising:
receiving, by the controller device, from the first display device, an indication that the presence sensitive sensor of the screen structure of the first display device is activated.

5. The method of claim 1, further comprising:
determining a side or a vertex of the first display device that is associated with the presence sensitive sensor of the screen structure of the first display device from which the screen structure of the first display device radiated the presence signal.

6. The method of claim 1, further comprising:
determining a side or a vertex of the second display device that is associated with the presence sensitive sensor of the screen structure of the second display device at which the second display device detected the radiated presence signal.

7. The method of claim 1, further comprising:
determining a side or a vertex of the first display device that is associated with the presence sensitive sensor of the screen structure of the first display device from which the first display device radiated the presence signal;
determining a side or a vertex of the second display device that is associated with the presence sensitive sensor of the screen structure of the second display device at which the second display device detected the radiated presence signal; and
determining the spatial arrangement of the first and second display devices on the surface also based on the determined sides or vertices of the first and second display devices that radiated and detected the radiated presence signal.

8. The method of claim 1, wherein the screen structure of each display device includes a capacitive touch screen having a grid structure for the set of presence sensitive sensors.

9. The method of claim 1, further comprising:
obtaining dimensions of the screen structures of the first and second display device.

10. A controller device, comprising:
wherein the controller device is coupled to at least one of a set of displays that are spatially arranged so that each display device is positioned adjacent at least one other display device and wherein each display device includes a screen structure having a set of presence sensitive sensors, with each display device being operable, for each presence sensitive sensor of a corresponding screen structure, to detect a presence signal and to radiate a presence signal; and
wherein the controller device further comprises a processor and a memory, with the memory containing instructions executable by the processor whereby the processor is configured to:
initiate a timer associated with determining that a detection of the radiated presence signal is within a certain time period after the presence signal is radiated;
receive an indication that a second display device of the set of display devices has detected a presence signal radiated from a presence sensitive sensor of a screen structure of a first display device of the set of display devices at a presence sensitive sensor of a screen structure of the second display device; and
in response to determining that the presence signal radiated from the presence sensitive sensor of the screen structure of the first display device is detected in the certain time period based on the timer, determine a spatial arrangement of the first and second display devices on a surface based on a location of the presence sensitive sensor on the screen structure of the first display device from which the first display device radiated the presence signal and a location of the presence sensitive sensor on the screen structure of the second display device at which the second display device detected the radiated presence signal.

11. The controller device of claim 10, wherein the memory contains instructions executable by the processor whereby the processor is further configured to:
determine to activate the presence sensitive sensor of the screen structure that is associated with a side or vertex of the first display device to radiate the presence signal from that presence sensitive sensor.

12. The controller device of claim 10, wherein the memory contains instructions executable by the processor whereby the processor is further configured to:
  send, to the first display device, an indication that includes a request to activate the presence sensitive sensor of the screen structure of the first display device.

13. The controller device of claim 12, whereby the processor is further configured to:
  receive, from the first display device, an indication that the presence sensitive sensor of the screen structure of the first display device is activated.

14. The controller device of claim 12, wherein the memory contains instructions executable by the processor whereby the processor is further configured to:
  determine a side or a vertex of the first display device that is associated with the presence sensitive sensor of the screen structure of the first display device from which the first display device radiated the presence signal;
  determine a side or a vertex of the second display device that is associated with the presence sensitive sensor of the screen structure of the second display device at which the second display device detected the radiated presence signal; and
  determine the spatial arrangement of the first and second display devices on the surface also based on the determined sides or vertices of the first and second display devices that radiated and detected the radiated presence signal.

15. The controller device of claim 10, wherein the screen structure of each display device includes a capacitive touch screen having a grid structure for the set of presence sensitive sensors.

16. The controller device of claim 10, wherein the memory contains instructions executable by the processor whereby the processor is further configured to:
  obtain dimensions of the screen structures of the first and second display device.

* * * * *